United States Patent
Pan

(10) Patent No.: US 11,287,949 B2
(45) Date of Patent: Mar. 29, 2022

(54) METHOD AND DEVICE FOR DISPLAYING ICON

(71) Applicants: Gree Electric Appliances (Wuhan) Co., Ltd, Hubei (CN); Gree Electric Appliances, Inc. of Zhuhai, Guangdong (CN)

(72) Inventor: Hong Pan, Guangdong (CN)

(73) Assignees: Gree Electric Appliances (Wuhan) Co., Ltd, Wuhan (CN); Gree Electric Appliances, Inc. of Zhuhai, Zhuhai (CN)

(*) Notice: Subject to any disclaimer, the term of this patent is extended or adjusted under 35 U.S.C. 154(b) by 0 days.

(21) Appl. No.: 16/643,837

(22) PCT Filed: Dec. 25, 2017

(86) PCT No.: PCT/CN2017/118241
§ 371 (c)(1),
(2) Date: Mar. 2, 2020

(87) PCT Pub. No.: WO2019/047423
PCT Pub. Date: Mar. 14, 2019

(65) Prior Publication Data
US 2021/0064219 A1    Mar. 4, 2021

(30) Foreign Application Priority Data
Sep. 11, 2017 (CN) .......................... 201710814220.1

(51) Int. Cl.
G06F 3/048       (2013.01)
G06F 3/04817    (2022.01)
G06F 9/451       (2018.01)

(52) U.S. Cl.
CPC .......... G06F 3/04817 (2013.01); G06F 9/451 (2018.02)

(58) Field of Classification Search
None
See application file for complete search history.

(56) References Cited

U.S. PATENT DOCUMENTS

| | | | | |
|---|---|---|---|---|
| 2007/0011622 A1* | 1/2007 | Chae | .................... | G06F 16/1734 715/764 |
| 2013/0132896 A1* | 5/2013 | Lee | ........................ | G06F 16/907 715/808 |
| 2014/0108978 A1* | 4/2014 | Yu | ........................ | G06F 3/04817 715/765 |

FOREIGN PATENT DOCUMENTS

| | | |
|---|---|---|
| CN | 1896996 A | 1/2007 |
| CN | 102508649 A | 9/2011 |

(Continued)

OTHER PUBLICATIONS

International Search Report, dated Jun. 19, 2018, in International application No. PCT/CN2017/118241, filed on Dec. 25, 2017.

(Continued)

*Primary Examiner* — Thanh T Vu
(74) *Attorney, Agent, or Firm* — McAndrews, Held & Malloy, Ltd.

(57) ABSTRACT

A method and device for displaying icon are disclosed. The method includes: receiving an instruction for displaying icon by a mobile terminal, and determining, for each first icon to be displayed, a target duration corresponding to each first icon according to a first time of receiving the instruction for displaying icon and a second time stored for each first icon, wherein the second time is the time when a first application program corresponding to each first icon is used for the last time; determining, according to the target duration corresponding to each first icon and a pre-stored corresponding relation between a duration and an identifier, a first target (Continued)

identifier corresponding to each first icon; and displaying, on a desktop, each first icon carrying a corresponding first target identifier.

12 Claims, 4 Drawing Sheets

(56) References Cited

FOREIGN PATENT DOCUMENTS

| CN | 102508649 A | 6/2012 |
|----|-------------|--------|
| CN | 104021065 A | 9/2014 |
| CN | 104350453 A | 2/2015 |
| CN | 107145270 A | 4/2017 |
| KR | 20140038852 A | 3/2014 |
| KR | 20140134868 A | 11/2014 |

OTHER PUBLICATIONS

Chinese search report—1 dated May 11, 2021 in Chinese application No. 2017108142201.
Chinese search report—2 dated May 11, 2021 in Chinese application No. 2017108142201.

* cited by examiner

METHOD AND DEVICE FOR DISPLAYING ICON

This application is a 371 of International Patent Application No. PCT/CN2017/118241, filed Dec. 25, 2017, which claims benefit of Chinese Patent Application No. 201710814220.1, filed to the China Patent Office on Sep. 11, 2017, entitled "Icon Display Method and Apparatus," contents of both of which are hereby incorporated by reference in their entirety.

TECHNICAL FIELD

The present disclosure relates to the technical field of mobile terminals, and more particularly to a method and device for displaying icon.

BACKGROUND

With the advancement of technology, applications have been booming, and users have installed more and more applications on mobile terminals, also leading to more and more icons for applications displayed on mobile terminals. It has become very cumbersome to find the icons of the applications needed in the icons of a wide variety of applications. How to make users find the icons of the applications they need accurately and quickly becomes more and more important.

In order to facilitate a user to quickly find an icon of a needed application, a method known to the inventors mainly includes: sorting the icon into a corresponding type of folder according to the type of the application corresponding to the icon, and displaying it as a small icon in the folder; or directly deleting icons of applications that are not commonly used by the user, so as to facilitate the user's search. However, in the above method, it is displayed as a small icon in the folder. Because the displayed icon is small, the user needs to select the folder to view each icon located in the folder, and the operation is inconvenient. Directly deleting icons of applications that are not commonly used makes the user unable to continuously use the application of which the icon is removed, thereby bringing inconvenience to the user.

SUMMARY

The embodiments of the present disclosure discloses a method for displaying icon, applied to a mobile terminal. The method includes:

an instruction for displaying icon is received;

for each first icon to be displayed, a target duration corresponding to each first icon is determined according to a first time of receiving the instruction for displaying icon and a second time stored for each first icon, wherein the second time is the time when a first application program corresponding to each first icon is used for the last time;

according to the target duration corresponding to each first icon and a pre-stored corresponding relation between a duration and an identifier, a first target identifier corresponding to each first icon is determined;

each first icon carrying a corresponding first target identifier is displayed on a desktop according to the first target identifier corresponding to each first icon.

In some embodiments of the present disclosure, the step of determining, according to the target duration corresponding to each first icon and the pre-stored corresponding relation between a duration and an identifier, the first target identifier corresponding to each first icon includes:

according to the target duration corresponding to each first icon and the pre-stored corresponding relation between a duration and a crack generation intensity, a target crack generation intensity corresponding to each first icon is searched;

a target crack corresponding to each first icon is generated according to the target crack generation intensity corresponding to each first icon.

In some embodiments of the present disclosure, the step of displaying, on the desktop, each first icon carrying the corresponding first target identifier according to the first target identifier corresponding to each first icon includes:

a display position for displaying each first icon on the desktop is determined according to the target duration corresponding to each first icon;

each first icon carrying the corresponding first target identifier is displayed at a corresponding display position on the desktop.

In some embodiments of the present disclosure, after determining the target duration that the first application program is not used, and before determining, according to the target duration corresponding to each first icon and the pre-stored corresponding relation between a duration and an identifier, the first target identifier corresponding to each first icon, the method further includes:

it is determined whether there is a second icon of which a target duration is less than a set duration threshold;

if there is a second icon of which the target duration is less than the set duration threshold, query the second icon is filtered;

according to the target duration corresponding to each first icon and a pre-stored corresponding relation between the duration and the identifier, the first target identifier corresponding to each first icon is determined.

In some embodiments of the present disclosure, if there is a filtered second icon, the method further includes:

the filtered second icon is directly displayed on the desktop.

In some embodiments of the present disclosure, the method further includes:

if an operation for ending the application program is received, a second application program corresponding to the operation is identified;

a third icon corresponding to the second application program is determined;

a second time stored for the third icon is updated.

In some embodiments of the present disclosure, the method further includes:

an operation for sorting icon is received, wherein the operation for sorting icon carries information of a second target identifier carried by an icon to be sorted;

a currently displayed fourth icon carrying the second target identifier is sorted according to the received information of the second target identifier.

The present disclosure discloses a device for displaying icon, applied to a mobile terminal. The device includes:

a first determination element, configured to receive an instruction for displaying icon, and determine, for each first icon to be displayed, a target duration corresponding to each first icon according to a first time of receiving the instruction for displaying icon and a second time stored for each first icon, wherein the second time is the time when a first application program corresponding to each first icon is used for the last time;

a second determination element, configured to determine, according to the target duration corresponding to each first icon and a pre-stored corresponding relation between a duration and an identifier, a first target identifier corresponding to each first icon; and a display element, configured to display, on a desktop, each first icon carrying the corresponding first target identifier according to the first target identifier corresponding to each first icon.

In some embodiments of the present disclosure, the second determination element is configured to: search, according to the target duration corresponding to each first icon and the pre-stored corresponding relation between a duration and a crack generation intensity, a target crack generation intensity corresponding to each first icon; and generate a target crack corresponding to each first icon according to the target crack generation intensity corresponding to each first icon.

In some embodiments of the present disclosure, the display element is configured to determine a display position for displaying each first icon on the desktop according to the target duration corresponding to each first icon, and display, at a corresponding display position on the desktop, each first icon carrying the corresponding first target identifier.

In some embodiments of the present disclosure, the device further includes:

a filter element, configured to determine whether there is a second icon of which a target duration is less than a set duration threshold, and if there is a second icon of which the target duration is less than the set duration threshold, filter the second icon and trigger the second determination element.

In some embodiments of the present disclosure, the display element is further configured to directly display, if there is the second icon filtered by the filter element, the second icon on the desktop.

In some embodiments of the present disclosure, the device further includes:

an update element, configured to identify, if an operation for ending the application program is received, a second application program corresponding to the operation, determine a third icon corresponding to the second application program, and update a second time stored for the third icon.

In some embodiments of the present disclosure, the device further includes:

a sorting element, configured to: receive an operation for sorting icon, wherein the operation for sorting icon carries information of a second target identifier carried by an icon to be sorted; and sort a currently displayed fourth icon carrying the second target identifier according to the received information of the second target identifier.

BRIEF DESCRIPTION OF THE DRAWINGS

In order to more clearly illustrate the embodiments of the present disclosure or the technical solutions in the method known to the inventors, the drawings used in the description of the embodiments or the method known to the inventors will be briefly described below. It is apparent that the drawings in the following description are only some embodiments of the present disclosure, and other drawings are obtained from those skilled in the art according to these drawings without any creative work.

DETAILED DESCRIPTION OF THE EMBODIMENTS

The technical solutions In some embodiments of the present disclosure will be clearly and completely described hereinbelow with the drawings In some embodiments of the present disclosure. It is apparent that the described embodiments are only part of the embodiments of the present disclosure, not all of the embodiments. On the basis of the embodiments of the present disclosure, other embodiments obtained on the premise of no creative work of those of ordinary skill in the art fall within the scope of protection of the present disclosure.

Embodiment 1

Figure 1:
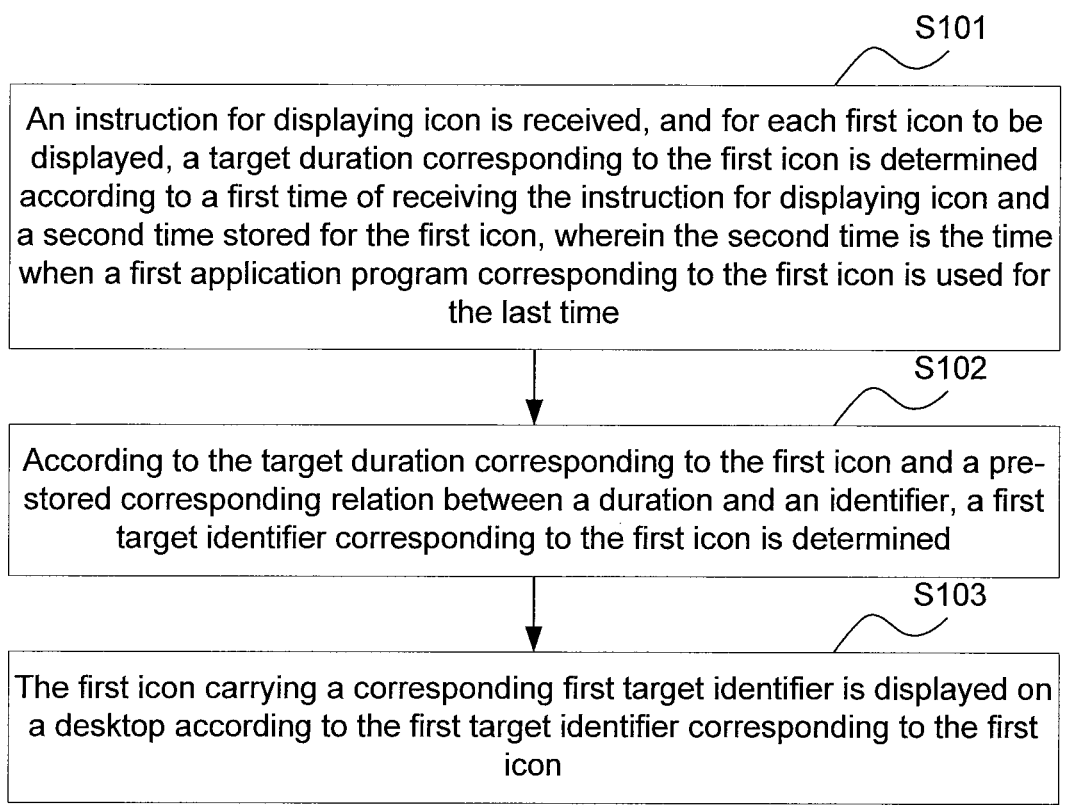
FIG. 1 is a flowchart of a process for displaying icon according to Embodiment 1 of the present disclosure.

FIG. 1 is a flowchart of a process for displaying icon according to Embodiment 1 of the present disclosure. The process includes the following steps:

S101: An instruction for displaying icon is received, and for each first icon to be displayed, a target duration corresponding to each first icon is determined according to a first time of receiving the instruction for displaying icon and a second time stored for each first icon, wherein the second time is the time when a first application program corresponding to each first icon is used for the last time.

The method for displaying icon provided by the embodiments of the present disclosure is applied to a mobile terminal, in some embodiments, the mobile terminal is a device such as a mobile phone or a tablet computer. In some embodiments of the present disclosure, when the mobile terminal displays a desktop icon, the method for displaying icon provided by some embodiments of the present disclosure is used.

A second time is stored for each first icon to be displayed in the local area of the mobile terminal, wherein the second time is the time when a first application program corresponding to each first icon is last used on the mobile terminal. When the mobile terminal identifies an operation of a user entering the desktop of the mobile terminal, for example, receives an operation of the user pressing a home key of the mobile terminal to enter the desktop, or receives an operation of the user unlocking the mobile terminal into the desktop, it is determined that an instruction for displaying icon is received, and for each first icon to be displayed, a target duration corresponding to each first icon is determined according to a first time of receiving the instruction for displaying icon and a second time stored for each first icon, wherein the target duration corresponding to each first icon is a duration that the first application program corresponding to each first icon is not used on the mobile terminal.

For example, the first time when the instruction for displaying icon is received is 11:00 on Aug. 11, 2017, the second time stored for icon A is 11:00 on Aug. 10, 2017, the second time stored for icon B is 10:00 on Aug. 1, 2017, the second time stored for icon C is 10:00 on Aug. 11, 2017, and it is determined that the target duration corresponding to icon A is 24 hours, the target duration corresponding to icon B is 241 hours, and the target duration corresponding to icon C is 1 hour.

S102: According to the target duration corresponding to each first icon and a pre-stored corresponding relation between a duration and an identifier, a first target identifier corresponding to each first icon is determined.

In some embodiments of the present disclosure, a corresponding relation between a duration and an identifier is pre-stored in the mobile terminal, different durations correspond to different identifiers, or different duration segments correspond to different identifiers. In some embodiments of the present disclosure, the identifier is a color identifier, a pattern identifier, an animated identifier, or the like, and is a digital pattern, a symbol pattern, a shape pattern, or the like if it is a pattern identifier. For example, a duration less than or equal to 24 hours corresponds to a three-pointed star, a duration greater than 24 hours and less than or equal to 48 hours corresponds to a four-pointed star, a duration greater than 48 hours and less than or equal to 120 hours corresponds to a five-pointed star, and a duration greater than 120 hours corresponds to a six-pointed star.

In some embodiments of the present disclosure, the identifier is pre-stored in the mobile terminal, or is stored by the user after drawing, or is stored after the user downloads. The user sets a duration, an identifier, and the corresponding relation between the duration and the identifier according to own usage habits. For example, the user imports pre-drawn line patterns of grasses, florets, and small trees into the mobile terminal for storage, and uses them as identifiers, and also sets a line pattern of a grass corresponding to a duration less than or equal to 24 hours, a line pattern of a floret corresponding to a duration greater than 24 hours and less than or equal to 72 hours, and a line pattern of a tree corresponding to a duration greater than 72 hours.

In some embodiments of the present disclosure, after a duration corresponding to each first icon is determined, that is, after the target duration that each first application program corresponding to each first icon to be displayed is not used, a target identifier corresponding to each first icon is determined according to a pre-stored corresponding relation between a duration and an identifier. For example, the target duration corresponding to icon A is 24 hours, the target duration corresponding to icon B is 241 hours, the target duration corresponding to icon C is 1 hour, the pre-stored corresponding relation between a duration and an identifier is that the duration less than or equal to 24 hours corresponds to a three-pointed star, the duration greater than 24 hours and less than or equal to 48 hours corresponds to a four-pointed star, the duration greater than 48 hours and less than or equal to 120 hours corresponds to a five-pointed star, and the duration greater than 120 hours corresponds to a six-pointed star, so it is determined that icon A corresponds to the three-pointed star, icon B corresponds to the six-pointed star, and icon C corresponds to the three-pointed star.

S103: Each first icon carrying a corresponding first target identifier is displayed on a desktop according to the first target identifier corresponding to each first icon.

In some embodiments of the present disclosure, each first icon carrying the corresponding target identifier is displayed on a desktop according to the target identifier corresponding to each first icon. For example, icon A corresponds to the three-pointed star, icon B corresponds to the six-pointed star, icon C corresponds to the three-pointed star, icon A carrying the three-pointed star is displayed on the desktop, icon B carrying the six-pointed star is displayed, and icon C carrying the three-pointed star is displayed.

In addition, In some embodiments of the present disclosure, when each first icon carrying the corresponding target identifier is displayed on the desktop, the position where each icon displays the target identifier is the same, or different. For example, the target identifier is displayed in the upper left corner of each first icon, is displayed in the upper right corner of each first icon, or is displayed in the center area of each first icon. In some embodiments of the present disclosure, the user sets a display position of the target identifier and each first icon according to own usage habits.

Since In some embodiments of the present disclosure, for each first icon to be displayed, a target duration corresponding to each first icon is determined according to a first time of receiving an instruction for displaying icon and a second time stored for each first icon, a target identifier corresponding to each first icon, and each first icon carrying the corresponding target identifier is displayed on a desktop. A user views each icon carrying the target identifier on the desktop, which increases the recognition degree of the icon, facilitates the user's viewing, and brings convenience for the user to use an application program, thereby improving the user experience.

Embodiment 2

In order to facilitate the user to find an icon, based on the above embodiments, the step of determining, according to the target duration corresponding to each first icon and the pre-stored corresponding relation between a duration and an identifier, the first target identifier corresponding to each first icon includes:

according to the target duration corresponding to each first icon and the pre-stored corresponding relation between a duration and a crack generation intensity, a target crack generation intensity corresponding to each first icon is searched.

A target crack corresponding to each first icon is generated according to the target crack generation intensity corresponding to each first icon.

In some embodiments of the present disclosure, the target identifier is a crack. A corresponding relation between a duration and a crack generation intensity is pre-stored in the local part of the mobile terminal, after determining the target duration corresponding to each first icon, the target crack generation intensity corresponding to each first icon is found according to the target duration corresponding to each first icon and the pre-stored corresponding relation between a duration and a crack generation intensity, and the target crack corresponding to each first icon is generated according to the target crack generation intensity corresponding to each first icon.

For example, the pre-stored corresponding relation between a duration and a crack generation intensity is that the duration less than or equal to 24 hours corresponds to crack generation intensity 1, the duration greater than 24 hours and less than or equal to 48 hours corresponds to crack generation intensity 2, the duration greater than 48 hours and less than or equal to 120 hours corresponds to crack generation intensity 3, and the duration greater than 120 hours corresponds to crack generation intensity 4, wherein as the crack generation intensity increases, the number of cracks and/or the width of cracks corresponding to the generated crack increases. The target duration corresponding to icon A is 24 hours, and the target crack corresponding to icon A is generated by crack generation intensity 1. The target duration corresponding to icon B is 241 hours, and the target crack corresponding to icon B is generated by crack generation intensity 4.

The generation of cracks according to the crack generation intensity is the method known to the inventors, and will not be described again In some embodiments of the present disclosure.

In addition, in some embodiments of the present disclosure, in order to improve the aesthetics of the desktop and improve the visual experience of the user, a generated target crack is artistically processed. For example, the generated target crack is mosaicked, or the generated target crack is made into a pattern similar to the dry crack of soil, or the generated target crack is made into a pattern similar to oil painting, thereby improving the aesthetics of the desktop and improving the visual experience of the user.

Embodiment 3

In order to further improve the efficiency of the user finding icons, based on the above embodiments, In some embodiments of the present disclosure, the step of displaying, on the desktop, each first icon carrying the corresponding first target identifier according to the first target identifier corresponding to each first icon includes:

a display position for displaying each first icon on the desktop is determined according to the target duration corresponding to each first icon;

each first icon carrying the corresponding first target identifier is displayed at a corresponding display position on the desktop.

When each first icon carrying the corresponding target identifier is displayed on the desktop, since each icon already exists on the desktop, and there is a corresponding display position on the desktop, each first icon carrying the corresponding target identifier is displayed at the display position corresponding to each first icon on the desktop. But in order to further improve the efficiency of the user finding icons, in some embodiments of the present disclosure, the display position of each first icon displayed on the desktop is determined according to the target duration corresponding to each first icon, that is, the duration when the first application program corresponding to each first icon is not used.

In some embodiments of the present disclosure, the display position for displaying each first icon on the desktop is determined according to the target duration corresponding to each first icon. For example, according to the size of the target duration corresponding to each first icon, each first icon is sequentially sorted according to the descending order of the target duration, and the display position for displaying each first icon on the desktop is determined. Or, according to the size of the target duration corresponding to each first icon, each first icon is sequentially sorted according to the ascending order of the target duration, and the display position for displaying each first icon on the desktop is determined. Each first icon carrying the corresponding target identifier is displayed at each display position on the desktop according to the display position for displaying each first icon on the desktop.

Figure 2:
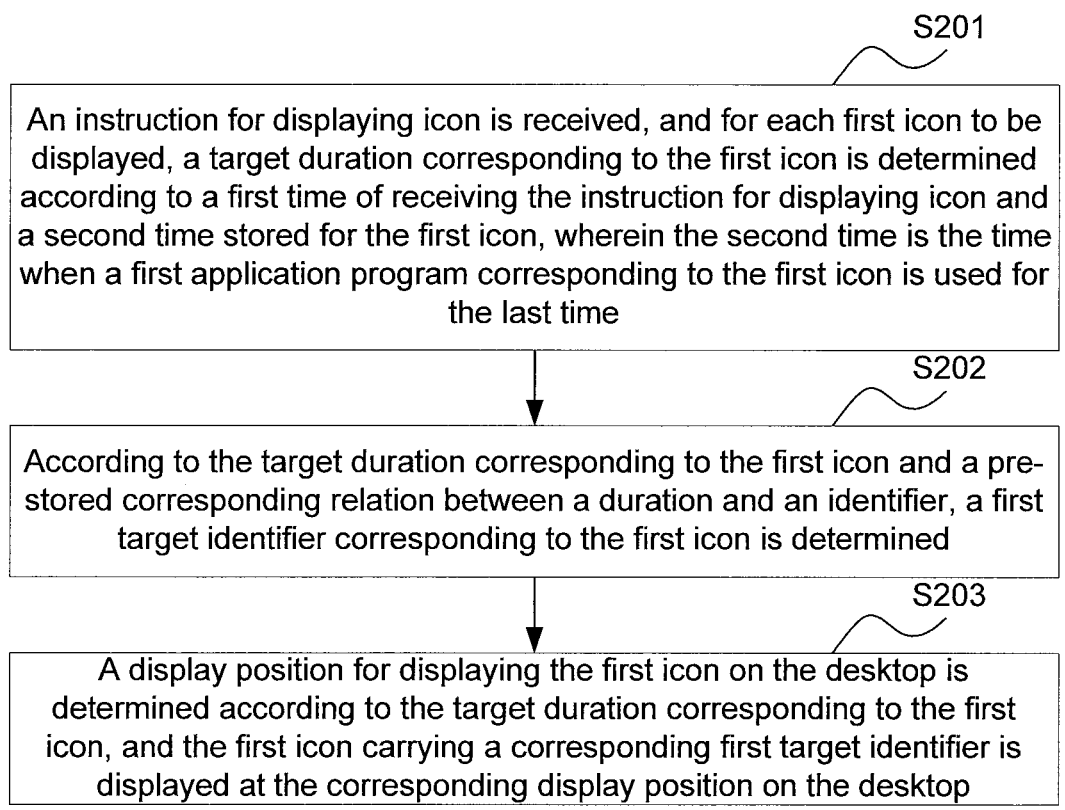
FIG. 2 is a flowchart of a process for displaying icon according to Embodiment 3 of the present disclosure.

FIG. 2 is a flowchart of a process for displaying icon according to Embodiment 3 of the present disclosure. The process includes the following steps:

S201: An instruction for displaying icon is received, and for each first icon to be displayed, a target duration corresponding to each first icon is determined according to a first time of receiving the instruction for displaying icon and a second time stored for each first icon, wherein the second time is the time when a first application program corresponding to each first icon is used for the last time.

S202: According to the target duration corresponding to each first icon and a pre-stored corresponding relation between a duration and an identifier, a first target identifier corresponding to each first icon is determined.

S203: A display position for displaying each first icon on the desktop is determined according to the target duration corresponding to each first icon, and each first icon carrying a corresponding first target identifier is displayed at the corresponding display position on the desktop.

Embodiment 4

In order to facilitate the user to intuitively understand the duration when an application program corresponding to an icon is not used, and further improve the efficiency of the user finding the icon, based on the above embodiments, In some embodiments of the present disclosure, after determining the target duration that the first application program is not used, and before determining, according to the target duration corresponding to each first icon and the pre-stored corresponding relation between a duration and an identifier, the first target identifier corresponding to each first icon, the method further includes:

it is determined whether there is a second icon of which a target duration is less than a set duration threshold;

if there is a second icon of which the target duration is less than the set duration threshold, the second icon is filtered;

according to the target duration corresponding to each first icon and a pre-stored corresponding relation between the duration and the identifier, the first target identifier corresponding to each first icon is determined.

If there is a filtered second icon, the method further includes:

the filtered second icon is directly displayed on the desktop.

In order to facilitate the user to more intuitively distinguish which application programs corresponding to the icons have been used recently, or have not been used, In some embodiments of the present disclosure, the mobile terminal has a preset duration threshold, wherein the preset duration threshold is 5 hours, 10 hours, 24 hours, etc. The duration threshold is configured in advance when the mobile terminal is shipped from the factory, that is, the preset duration thresholds in each mobile terminal are the same. In some embodiments of the present disclosure, the user also sets the preset duration threshold according to own needs.

In some embodiments of the present disclosure, before the target identifier corresponding to each first icon is determined according to the target duration corresponding to each first icon and the pre-stored corresponding relation between a duration and an identifier, it is determined whether there is a second icon of which the target duration is less than a set duration threshold, and if yes, each second icon of which the target duration is less than the set duration threshold is filtered. Then, when the icon is displayed, each filtered second icon is directly displayed on the desktop, and each unfiltered first icon carrying the corresponding target identifier is displayed on the desktop.

In order to further improve the efficiency of the user finding the icon, in some embodiments of the present disclosure, if the display position of each icon is determined according to the ascending order of the target duration when the display position of each icon is determined according to the duration when the application program corresponding to each icon is not used, an icon with the front display position is the filtered second icon during specific display, each icon does not carry the target identifier, In some embodiments of the present disclosure, an icon with the back display position is a first icon, and each icon carries the target identifier, so as to facilitate the viewing of the user.

Figure 3:
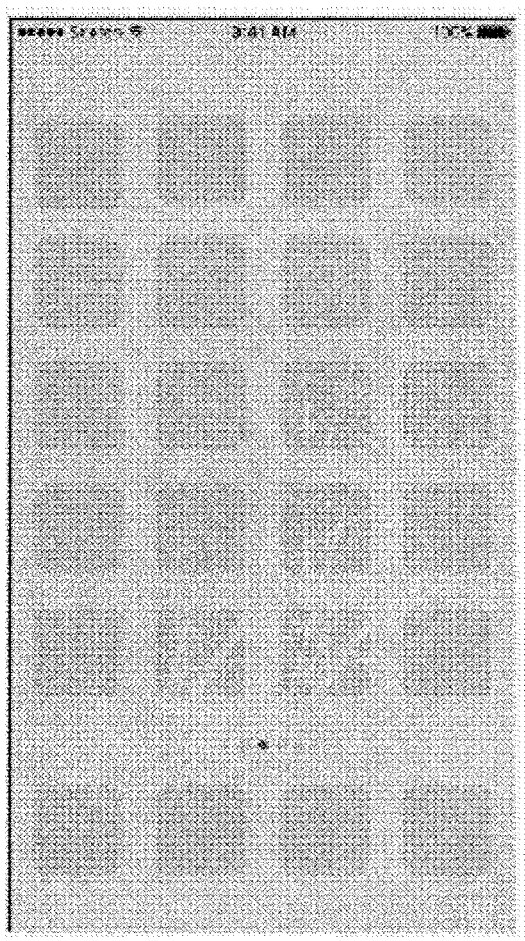
FIG. 3 is a schematic diagram of a display effect of desktop according to Embodiment 4 of the present disclosure.

FIG. 3 is a schematic diagram of a display effect of desktop according to an Embodiment 4 of the present disclosure. The target identifier carried on the icon in FIG. 3 is a crack, wherein there are multiple second icons having the target duration less than the set duration threshold, which are directly displayed on the desktop, for example, each icon displayed in the rightmost row (left and right shown in FIG. 3) in FIG. 3, for each first icon having the target duration not less than the set duration threshold, because the target identifier carried by each first icon is determined according to the pre-stored corresponding relation between a duration and a identifier, each first icon carrying the corresponding target identifier is displayed on the desktop, In some embodiments of the present disclosure referring to each icon displaying a crack in FIG. 3.

In addition, because each icon carries the corresponding target identifier and the target duration corresponding to each target identifier is also known, in some embodiments of the present disclosure, the user sorts the icon according to the target identifier carried by the icon, for example, delete and transfer the icon. The method further includes:

An operation for sorting icon is received, wherein the operation for sorting icon carries information of a second target identifier carried by an icon to be sorted.

A currently displayed fourth icon carrying the second target identifier is deleted according to the received information of the second target identifier.

In some embodiments of the present disclosure, when the icon is sorted, the user inputs an operation for sorting icon, wherein the operation for sorting icon carries information of the second target identifier carried by the icon to be sorted. The specific operation for sorting icon is an operation of pressing an icon by the user, and the icon carries a second target identifier information. For example, the mobile terminal identifies that the user presses an icon for more than 3 seconds, and the icon carries the second target identifier, so the mobile terminal uses the operation as the operation for sorting icon. After receiving the operation for sorting icon, the mobile terminal performs operations such as batch deletion and batch movement for the icon that is selected by the user and carries the second target identifier. For example, selected icons carrying the second target identifier is moved to an infrequently used icon folder, or selected icons that carry the second target identifier are deleted.

Embodiment 5

In order to ensure the accuracy of the determined target identifier corresponding to each icon, and facilitate the user to find an icon, based on the above embodiments, In some embodiments of the present disclosure, the method further includes:

If an operation for ending the application program is received, a second application program corresponding to the operation is identified;

a third icon corresponding to the second application program is determined;

a second time stored for the third icon is updated.

In order to facilitate determination of the target duration corresponding to each icon during displaying desktop icon, a corresponding second time is stored for each first icon in the mobile terminal, wherein the second time is the time when a first application program corresponding to each first icon is last used. In order to accurately record the time when each application program is last used, in some embodiments of the present disclosure, the time when the application program is last used is determined according to the operation for ending the application program.

For example, the mobile terminal receives the operation for ending the application program, the second application program corresponding to the operation is application program C, the time when application program C is last used is updated to 15:00 on Aug. 11, 2017 according to the time (15:00 on Aug. 11, 2017) when the operation is received, and the second time stored for the icon corresponding to application program C is updated to 15:00 on Aug. 11, 2017.

In some embodiments of the present disclosure, the operation for ending the application program is a shutdown operation, an operation of closing the application program, or the like.

In some embodiments of the present disclosure, it is also possible to update the second time of the corresponding icon when receiving the operation of enabling the application program.

Therefore, when the mobile terminal receives the instruction for displaying icon again, the target duration corresponding to each first icon is determined according to the updated second time stored for each first icon and the first time when the instruction for displaying icon is received. Therefore, the target identifier corresponding to each first icon is accurately determined, which is convenient for the user to identify and find the icon.

Embodiment 6

Figure 4:
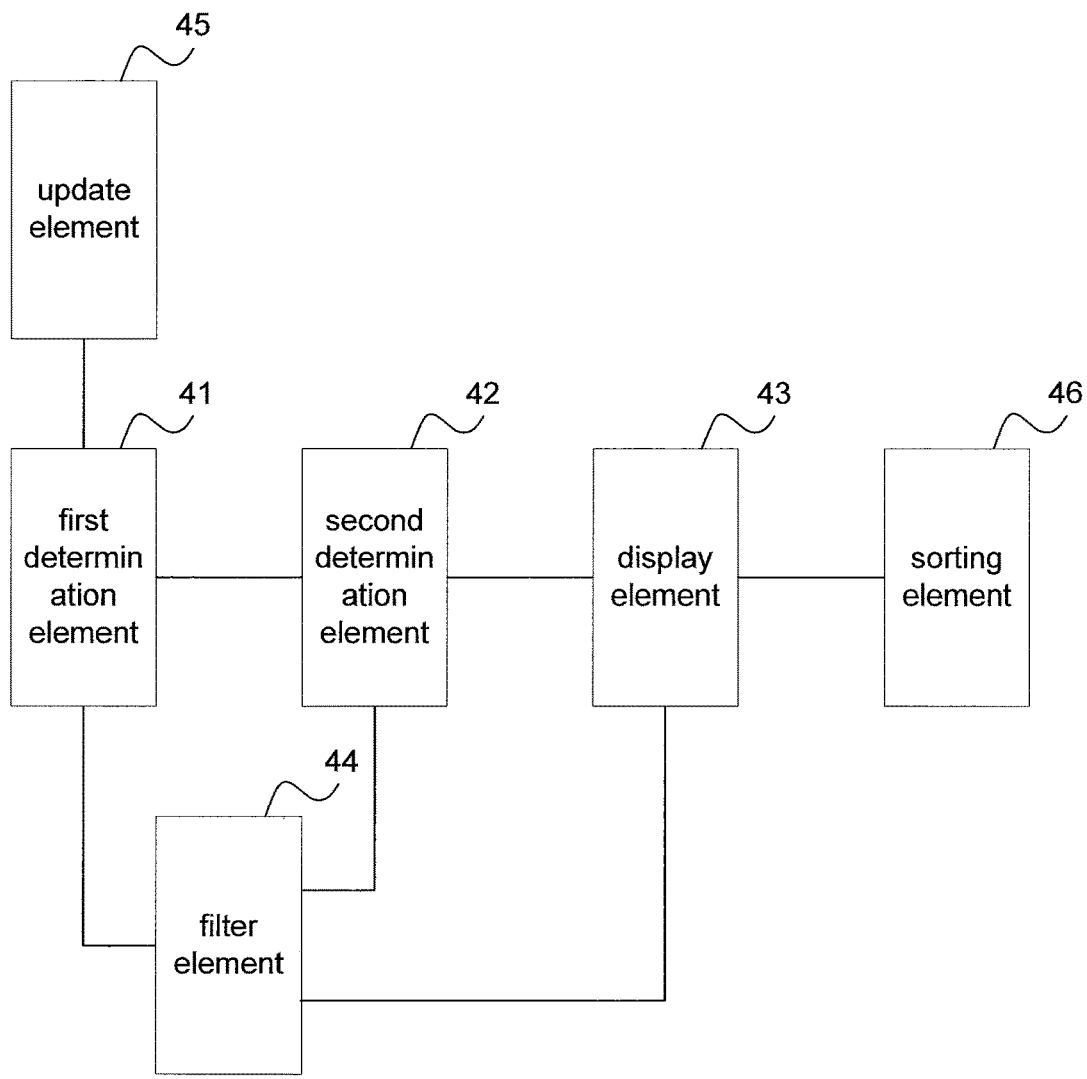
FIG. 4 is a schematic diagram of a device for, displaying icon according to Embodiment 5 of the present disclosure.

FIG. 4 is a schematic diagram of a device for displaying icon according to Embodiment 5 of the present disclosure. The device includes a first determination element 41, a second determination element 42 and a display element 43.

The first determination element 41 is configured to receive an instruction for displaying icon, and determine, for each first icon to be displayed, a target duration corresponding to each first icon according to a first time of receiving the instruction for displaying icon and a second time stored for each first icon, wherein the second time is the time when a first application program corresponding to each first icon is used for the last time.

The second determination element 42 is configured to determine, according to the target duration corresponding to each first icon and a pre-stored corresponding relation between a duration and an identifier, a first target identifier corresponding to each first icon.

The display element 43 is configured to display, on a desktop, each first icon carrying the corresponding first target identifier according to the first target identifier corresponding to each first icon.

The second determination element 42 is configured to: search, according to the target duration corresponding to each first icon and the pre-stored corresponding relation between a duration and a crack generation intensity, a target crack generation intensity corresponding to each first icon; and generate a target crack corresponding to each first icon according to the target crack generation intensity corresponding to each first icon.

The display element 43 is configured to determine a display position for displaying each first icon on the desktop according to the target duration corresponding to each first icon, and display, at a corresponding display position on the desktop, each first icon carrying the corresponding first target identifier.

The device further includes a filter element 44.

The filter element 44 is configured to determine whether there is a second icon of which a target duration is less than a set duration threshold, and if there is a second icon of which the target duration is less than the set duration threshold, filter the second icon and trigger the second determination element.

The display element 43 is further configured to directly display, if there is the second icon filtered by the filter element, the second icon on the desktop.

The device further includes an update element 45.

The update element 45 is configured to identify, if an operation for ending the application program is received, a second application program corresponding to the operation, determine a third icon corresponding to the second application program, and update a second time stored for the third icon.

The device further includes a sorting element 46.

The sorting element 46 is configured to: receive an operation for sorting icon, wherein the operation for sorting icon carries information of a second target identifier carried by an icon to be sorted; and sort a currently displayed fourth icon carrying the second target identifier according to the received information of the second target identifier.

Embodiment 7

Figure 5:
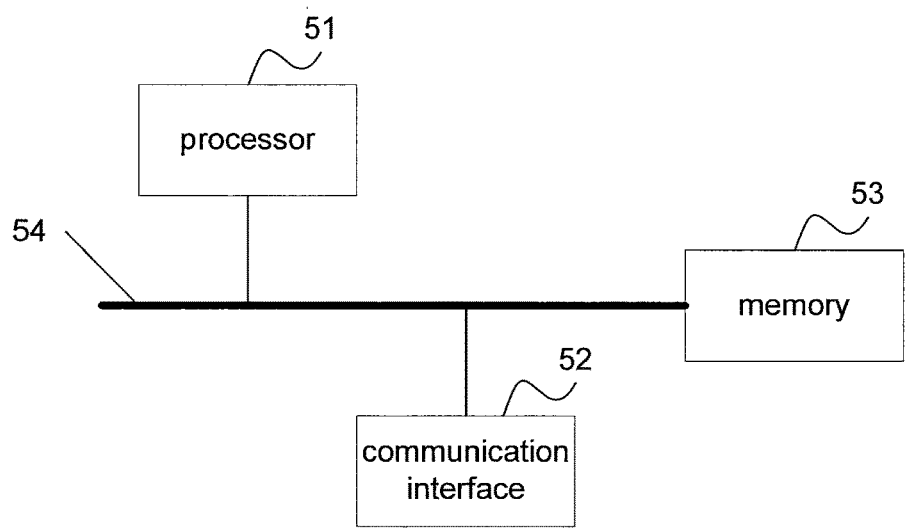
FIG. 5 is a schematic diagram of a mobile terminal according to Embodiment 7 of the present disclosure.

Based on the above embodiments, some embodiments of the present disclosure further provide a mobile terminal, as shown in FIG. 5, including: a processor 51, a communication interface 52, a memory 53, and a communication bus 54, wherein the processor 51, the communication interface 52 and the memory 53 complete communication with each other through the communication bus 54.

The memory 53 stores a computer program, wherein the computer program is executed by the processor 51 to enable the processor 51 to perform the following steps:

an instruction for displaying icon is received, and for each first icon to be displayed, a target duration corresponding to each first icon is determined according to a first time of receiving the instruction for displaying icon and a second time stored for each first icon, wherein the second time is the time when a first application program corresponding to each first icon is used for the last time;

according to the target duration corresponding to each first icon and a pre-stored corresponding relation between a duration and an identifier, a first target identifier corresponding to each first icon is determined;

each first icon carrying a corresponding first target identifier is displayed on a desktop according to the first target identifier corresponding to each first icon.

The electronic device provided by some embodiments of the present disclosure is a desktop computer, a portable computer, a smart phone, a tablet computer, a Personal Digital Assistant (PDA), a network side device, or the like.

In some embodiments of the present disclosure, the communication bus 54 mentioned in the above electronic device is a Peripheral Component Interconnect (PCI) bus or an Extended Industry Standard Architecture (EISA) bus or the like. The communication bus 54 is divided into an address bus, a data bus, a control bus, and the like. For ease of representation, only one thick line is shown in the figure, but it does not mean that there is only one bus or one type of bus.

The communication interface 52 is used for communication between the above mobile terminal and other devices.

The memory 53 includes a Random Access Memory (RAM), and also includes a Non-Volatile Memory (NVM), such as at least one disk memory. In some embodiments of the present disclosure, the memory 53 also is at least one storage device located remotely from the aforementioned processor 51.

The processor 51 is a general-purpose processor, including a central processing unit, a Network Processor (NP), etc.; or is a Digital Signal Processor (DSP), an application specific integrated circuit, a field programmable gate display, or other programmable logic devices, discrete gates or transistor logic devices, discrete hardware components, and the like.

Embodiment 8

Based on the above embodiments, some embodiments of the present disclosure further provide a computer readable storage medium. The computer readable storage medium stores a computer program that is executed by an electronic device. When the program is running on the electronic device, the electronic device implements the following steps:

an instruction for displaying icon is received, and for each first icon to be displayed, a target duration corresponding to each first icon is determined according to a first time of receiving the instruction for displaying icon and a second time stored for each first icon, wherein the second time is the time when a first application program corresponding to each first icon is used for the last time;

according to the target duration corresponding to each first icon and a pre-stored corresponding relation between a duration and an identifier, a first target identifier corresponding to each first icon is determined;

each first icon carrying a corresponding first target identifier is displayed on a desktop according to the first target identifier corresponding to each first icon.

The present disclosure discloses a method and device for displaying icon. The method includes: an instruction for displaying icon is received, and for each first icon to be displayed, a target duration corresponding to each first icon is determined according to a first time of receiving the instruction for displaying icon and a second time stored for each first icon, wherein the second time is the time when a first application program corresponding to each first icon is used for the last time; according to the target duration corresponding to each first icon and a pre-stored corresponding relation between a duration and an identifier, a first target identifier corresponding to each first icon is determined; and each first icon carrying a corresponding first target identifier is displayed on a desktop according to the first target identifier corresponding to each first icon. Since In some embodiments of the present disclosure, for each first icon to be displayed, a target duration corresponding to each first icon is determined according to a first time of receiving an instruction for displaying icon and a second time stored for each first icon, a target identifier corresponding to each first icon, and each first icon carrying the corresponding target identifier is displayed on a desktop. A user views each icon carrying the target identifier on the desktop, which increases the recognition degree of each icon, facilitates the user's viewing, and brings convenience for the user to use an application program, thereby improving the user experience.

For the system/device embodiments, since they are basically similar to the method embodiments, the description is relatively simple, and the relevant parts is referred to the description of the method embodiments.

Those skilled in the art should understand that the embodiments of the present disclosure are provided as a method, a system or a computer program product. Thus, the present disclosure adopts forms of complete hardware embodiments, complete software embodiments or embodiments integrating software and hardware. Moreover, the present disclosure adopts the form of a computer program product implemented on one or more computer available storage media (including, but not limited to, a disk memory, a CD-ROM, an optical memory and the like) containing computer available program codes.

The present disclosure is described with reference to flowcharts and/or block diagrams of the method, the device (system) and the computer program product according to the embodiments of the present disclosure. It is to be understood that each flow and/or block in the flowcharts and/or the block diagrams and a combination of the flows and/or the blocks in the flowcharts and/or the block diagrams is implemented by computer program instructions. These computer program instructions are provided for a general-purpose computer, a dedicated computer, an embedded processor or processors of other programmable data processing devices to generate a machine, so that a device for achieving functions designated in one or more flows of the flowcharts and/or one or more blocks of the block diagrams is generated via instructions executed by the computers or the processors of the other programmable data processing devices.

These computer program instructions also are stored in a computer readable memory capable of guiding the computers or the other programmable data processing devices to work in a specific mode, so that a manufactured product including an instruction device is generated via the instructions stored in the computer readable memory, and the instruction device achieves the functions designated in one or more flows of the flowcharts and/or one or more blocks of the block diagrams.

These computer program instructions also are loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

While some embodiments of the present disclosure have been described, those skilled in the art make additional changes and modifications to the embodiments once knowing a basic creativity concept. Therefore, the appended claims are intended to be interpreted as including the some embodiments and all the changes and modifications falling within the scope of the present disclosure.

It is apparent that those skilled in the art make various modifications and variations to the present disclosure without departing from the spirit and scope of the present disclosure. Thus, if such modifications and variations of the present disclosure fall within the scope of the appended claims and their equivalents, the present disclosure is also intended to cover the modifications and variations.

What is claimed is:

1. A method for displaying icon, applied to a mobile terminal, the method comprising:
   receiving an instruction for displaying icon;
   for each first icon to be displayed, determining a target duration corresponding to each first icon according to a first time of receiving the instruction for displaying icon and a second time stored for each first icon, wherein the second time is a time when a first application program corresponding to each first icon is used for a last time,
   wherein the target duration corresponding to each first icon is a duration that the first application program corresponding to each first icon is not used on the mobile terminal, the first icon is an icon of the first application program;
   determining, according to the target duration corresponding to each first icon and a pre-stored corresponding relation between a duration and an identifier, a first target identifier corresponding to each first icon; and
   displaying, on a desktop, each first icon carrying a corresponding first target identifier according to the first target identifier corresponding to each first icon,
   wherein determining, according to the target duration corresponding to each first icon and the pre-store corresponding relation between a duration and an identifier, the first target identifier corresponding to each first icon comprises:
   searching, according to the target duration corresponding to each first icon and the pre-stored corresponding relation between a duration and a crack generation intensity, a target crack generation intensity corresponding to each first icon; and
   generating a target crack corresponding to each first icon according to the target crack generation intensity corresponding to each first icon,
   wherein the crack generation intensity is used to indicate a number of cracks and a width of cracks, the target crack generation intensity is a crack generation intensity corresponding to each first icon.

2. The method according to claim 1, wherein displaying, on the desktop, each first icon carrying the corresponding first target identifier according to the first target identifier corresponding to each first icon comprises:
   determining a display position for displaying each first icon on the desktop according to the target duration corresponding to each first icon; and
   displaying, at a corresponding display position on the desktop, each first icon carrying the corresponding first target identifier.

3. The method according to claim 1, after determining the target duration that the first application program is not used, and before determining, according to the target duration corresponding to each first icon and the pre-stored corresponding relation between a duration and an identifier, the first target identifier corresponding to each first icon, the method further comprises:
   determining whether there is a second icon of which a target duration is less than a set duration threshold; and
   when there is a second icon of which the target duration is less than the set duration threshold, filtering the second icon, and performing subsequent steps.

4. The method according to claim 3, wherein when there is a filtered second icon, the method further comprises:
   directly displaying the filtered second icon on the desktop.

5. The method according to claim 1, further comprising:
   when an operation for ending the application program is received, identifying a second application program corresponding to the operation;
   determining a third icon corresponding to the second application program; and
   updating a second time stored for the third icon.

6. The method according to claim 1, further comprising:
   receiving an operation for sorting icon, wherein the operation for sorting icon carries information of a second target identifier carried by an icon to be sorted; and sorting a currently displayed fourth icon carrying the second target identifier according to the received information of the second target identifier.

7. A device for displaying icon, applied to a mobile terminal, the device comprising:
- a first determination element, configured to receive an instruction for displaying icon, and determine, for each first icon to be displayed, a target duration corresponding to each first icon according to a first time of receiving the instruction for displaying icon and a second time stored for each first icon, wherein the second time is a time when a first application program corresponding to each first icon is used for a last time, wherein the target duration corresponding to each first icon is a duration that the first application program corresponding to each first icon is not used on the mobile terminal, the first icon is an icon of the first application program;
- a second determination element, configured to determine, according to the target duration corresponding to each first icon and a pre-stored corresponding relation between a duration and an identifier, a first target identifier corresponding to each first icon; and
- a display element, configured to display, on a desktop, each first icon carrying the corresponding first target identifier according to the first target identifier corresponding to each first icon,
- wherein the second determination element is configured to: search, according to the target duration corresponding to each first icon and the pre-stored corresponding relation between a duration and a crack generation intensity, a target crack generation intensity corresponding to each first icon; and generate a target crack corresponding to each first icon according to the target crack generation intensity corresponding to each first icon, wherein the crack generation intensity is used to indicate a number of cracks and a width of cracks, the target crack generation intensity is a crack generation intensity corresponding to each first icon.

8. The device according to claim 7, wherein the display element is configured to determine a display position for displaying each first icon on the desktop according to the target duration corresponding to each first icon, and display, at a corresponding display position on the desktop, each first icon carrying the corresponding first target identifier.

9. The device according to claim 7, further comprising:
- a filter element, configured to determine whether there is a second icon of which a target duration is less than a set duration threshold, and when there is a second icon of which the target duration is less than the set duration threshold, filter the second icon and trigger the second determination element.

10. The device according to claim 9, wherein the display element is further configured to directly display, when there is the second icon filtered by the filter element, the second icon on the desktop.

11. The device according to claim 7, further comprising:
- an update element, configured to identify, when an operation for ending the application program is received, a second application program corresponding to the operation, determine a third icon corresponding to the second application program, and update a second time stored for the third icon.

12. The device according to claim 7, further comprising:
- a sorting element, configured to: receive an operation for sorting icon, wherein the operation for sorting icon carries information of a second target identifier carried by an icon to be sorted; and sort a currently displayed fourth icon carrying the second target identifier according to the received information of the second target identifier.

* * * * *